United States Patent
Namiki et al.

(10) Patent No.: US 11,295,406 B2
(45) Date of Patent: Apr. 5, 2022

(54) IMAGE MANAGEMENT DEVICE

(71) Applicant: FANUC Corporation, Yamanashi (JP)

(72) Inventors: Yuta Namiki, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 49 days.

(21) Appl. No.: 16/393,960

(22) Filed: Apr. 25, 2019

(65) Prior Publication Data

US 2019/0333182 A1 Oct. 31, 2019

(30) Foreign Application Priority Data

Apr. 27, 2018 (JP) .............................. JP2018-087628

(51) Int. Cl.
*G06T 1/00* (2006.01)
*G06F 16/11* (2019.01)
*G06F 16/51* (2019.01)

(52) U.S. Cl.
CPC .......... *G06T 1/0007* (2013.01); *G06F 16/113* (2019.01); *G06F 16/51* (2019.01)

(58) Field of Classification Search
CPC .. H04N 5/23203; H04N 5/23299; H04N 5/76; G06F 16/113; G06F 16/51; G06F 16/583; G06T 1/0007; G06T 1/60
See application file for complete search history.

(56) References Cited

U.S. PATENT DOCUMENTS

| | | | | |
|---|---|---|---|---|
| 9,488,592 | B1* | 11/2016 | Maresca | ................. G06T 5/002 |
| 2001/0050998 | A1* | 12/2001 | Firan | ....................... B41B 27/00 |
| | | | | 382/112 |
| 2003/0061212 | A1* | 3/2003 | Smith | ................. G06F 16/2453 |

(Continued)

FOREIGN PATENT DOCUMENTS

| | | |
|---|---|---|
| EP | 0547245 A1 | 6/1993 |
| JP | 2921718 B2 | 7/1999 |

(Continued)

OTHER PUBLICATIONS

Jacobsmuhlen et al. "High resolution imaging for inspection of laser beam melting systems." 2013 IEEE international instrumentation and measurement technology conference (I2MTC). IEEE, 2013. (Year: 2013).*

(Continued)

*Primary Examiner* — Katrina R Fujita
(74) *Attorney, Agent, or Firm* — Hauptman Ham, LLP

(57) ABSTRACT

An image management device includes: an image data acquisition unit that acquires image data snapped by a visual sensor; an image snap condition acquisition unit that acquires an image snap condition applied when the image data is snapped, from a manufacturing machine and the visual sensor; an archive data creation unit that creates archive data based on the image data and the image snap condition; and an archive data storage unit that stores the archive data. The archive data creation unit creates archive data after recording the image snap condition in a file. The image management device can easily reuse image data that is snapped by the visual sensor attached to the manufacturing machine and an image snap condition of the image data.

14 Claims, 6 Drawing Sheets

(56) References Cited

U.S. PATENT DOCUMENTS

| | | | |
|---|---|---|---|
| 2003/0182013 A1* | 9/2003 | Moreas | G01N 21/8901 |
| | | | 700/145 |
| 2006/0010416 A1* | 1/2006 | Keck | G05B 19/41875 |
| | | | 716/51 |
| 2009/0135269 A1 | 5/2009 | Nozaki et al. | |
| 2011/0096148 A1* | 4/2011 | Stratmann | G01J 5/025 |
| | | | 348/46 |
| 2011/0298901 A1* | 12/2011 | Derrien | G01N 21/9515 |
| | | | 348/50 |
| 2013/0235186 A1* | 9/2013 | Chen | G01N 21/9515 |
| | | | 348/126 |
| 2016/0012577 A1 | 1/2016 | Oka et al. | |
| 2017/0061209 A1 | 3/2017 | Watanabe | |
| 2018/0047128 A1* | 2/2018 | Ross | G06F 16/434 |

FOREIGN PATENT DOCUMENTS

| | | |
|---|---|---|
| JP | 201745166 A | 3/2017 |
| JP | 6205757 B2 | 10/2017 |
| WO | 2007060980 A1 | 5/2007 |

OTHER PUBLICATIONS

O'Byrne et al. "Protocols for Image Processing based Underwater Inspection of Infrastructure Elements." Journal of Physics: Conference Series. vol. 628. No. 1. IOP Publishing, 2015. (Year: 2015).*

* cited by examiner

```
1: MOVE_TO P1
2: VISION_FIND "VP1"
3: VISION_SAVE "VP1" "/log/00001.zip"
```

FIG.6

```
{
datetime: "2017/01/04 10:53:30",
program: "VP1",
images: [
  {
    file: "img00001.png",
      snap_pos: [2.3, 1.1, 10.6, 0.1, 0.2, 10],
      binning: 1,
  },
  {
    file: "img00002.png",
      snap_pos: [2.3, 1.1, 10.6, 0.1, 0.2, 10],
      binning: 1
  }
]
}
```

FIG.7

```
1: VISION_LOAD "/log/00001.zip" "VP1"
2: VISION_FIND "VP1"
```

IMAGE MANAGEMENT DEVICE

RELATED APPLICATION

The present application claims priority to Japanese Application Number 2018-087628 filed Apr. 27, 2018, the disclosure of which is hereby incorporated by reference herein in its entirety.

BACKGROUND OF THE INVENTION

1. Field of the Invention

The present invention relates to an image management device and especially relates to an image management device that manages image data which is acquired in a site of a factory and is related to a manufacturing machine.

2. Description of the Related Art

In manufacturing sites such as a factory, an industrial machine such as a robot provided with an industrial visual sensor detects conveyed objects and inspects machined workpieces. In execution of image processing with respect to an image of an object which is snapped by an industrial visual sensor, the snapped image sometimes needs to be recorded in a non-volatile memory or the like. In the case where detection of a conveyed object is failed or the case where a defective product is found in inspection of workpieces, for example, a cause of the case can be examined by reproducing and checking a state in acquisition of image data again, based on records of snapped images and detection results.

As a prior art technique related to management of image data acquired in a manufacturing site, U.S. Pat. No. 2,921,718, for example, has disclosed an image processing method in which image data and a detection result with respect to this image data are stored in an auxiliary storage device so as to be able to execute image processing later by reproducing a state at the time of execution of image processing with the image data.

A single image file is not enough in general to reproduce a state in execution of image processing for detecting conveyed objects or inspecting workpieces, and various types of information are required as follows.

1) A position of a camera used in snapping an image is required to calculate a position of an object viewed from a coordinate system of the robot based on the position of the object in an image coordinate system which is obtained by detecting a workpiece with the camera attached to a tip of a hand of the robot. Further, in order to calculate displacement, in a hand of a robot, of a workpiece gripped by the hand of the robot, a position of the robot in snapping an image is required.

2) A plurality of images required in execution of detection and inspection based on one vision program (a control program used for controlling an industrial machine and an industrial visual sensor so as to acquire and process images for detection of conveyed objects and inspection of workpieces) are sometimes snapped. For example, images with different brightness can be snapped by elongating exposure time for one image and shortening exposure time for another image. Respective images are used for different detection/inspection algorithms and accordingly, images respectively suitable for detection and inspection can be used. Further, a plurality of images can be snapped not only by changing exposure time but also by changing an image snap range in a viewing field or changing an image reduction ratio for snapping an image.

3) When an image reduction ratio or an image snap range is changed as mentioned above, information on the reduction ratio and the image snap range applied in snapping an image are required (when it is assumed that calibration of an industrial visual sensor is performed for an image in the maximum image snap range with no reduction ratio, for example, such information is required to change a detection value from an image coordinate to a robot coordinate by using calibration of the same industrial visual sensor).

Various types of information as those described above are required for every image data so as to reproduce image snap conditions applied in acquisition of the image data by an industrial visual sensor. As a prior art technique for recording various types of information, U.S. Pat. No. 6,205,757, for example, has proposed the method by which images are stored as a file and relevant information as the one described above and paths to images are recorded on database.

However, the image data management method disclosed in the prior art technique has a problem in that it is difficult to find corresponding image data and information related to the image data without a PC or the like on which dedicated software is installed. Further, image data and information related to these image data need to be collected so as to acquire information required to execute a certain single vision program. However, it is difficult to extract necessary information (a position of a robot, exposure time, and a reduction ratio, for example, described above) related to the image data from the collected information and accordingly, it is difficult to forward only necessary information to another place and to store only necessary information. Such problems become remarkable in environments in which a dedicated information processing device is not installed such as a manufacturing site, for example, a factory. Further, when a plurality of images are snapped in single execution of a vision program, it is further complex to collect a plurality of image files and respective image snap conditions.

SUMMARY OF THE INVENTION

An object of the present invention is to provide an image management device that is capable of easily reusing image data, which is snapped by a visual sensor attached to a manufacturing machine, and an image snap condition of the image data.

The image management device according to the present invention solves the above-described problems by the following method.

Image data acquired by an industrial visual sensor are stored as files one by one.

Information related to image data is recorded in a file which is easily accessible such as a text file. Information related to image data may be recorded in the image data, but a file requiring no special software for access thereto such as a text file is preferably used.

These information are collectively stored in one folder or compressed file.

These information are stored in a unit of one detection or a unit of one image snap.

According to an aspect of the present invention, an image management device that manages image data, which is snapped by a visual sensor in an environment in which a manufacturing machine is installed, includes: an image data acquisition unit that acquires image data snapped by the visual sensor; an image snap condition acquisition unit that acquires an image snap condition applied when the image data is snapped, from the manufacturing machine and the visual sensor; an archive data creation unit that creates archive data based on the image data and the image snap condition; and an archive data storage unit that stores the archive data. The archive data creation unit records the image snap condition in a text file.

According to another aspect of the present invention, an image management method for managing image data that is snapped by a visual sensor attached to a manufacturing machine executes: a first step for acquiring image data snapped by the visual sensor; a second step for acquiring an image snap condition applied when the image data is snapped, from the manufacturing machine and the visual sensor; a third step for creating archive data based on the image data and the image snap condition; and a fourth step for storing the archive data. The image snap condition is recorded in a text file in the third step.

According to the present invention, image data and an image snap condition applied in the snap of the image data can be easily taken out from archive data and referred to by a control device or the like in a site and the image snap condition can be reproduced and examined, for example, without using special software.

BRIEF DESCRIPTION OF THE DRAWINGS

The above-described and other objects and features of the present invention will be apparent from the following embodiment which is described in reference to the accompanying drawings. Among these drawings:

FIG. 6 is a diagram illustrating an example of a text file for recording image snap conditions;

FIG. 7 is a diagram illustrating another example of a control program; and

DETAILED DESCRIPTION OF THE PREFERRED EMBODIMENT

An embodiment according to the present invention is described below in reference to the accompanying drawings.

Figure 1:
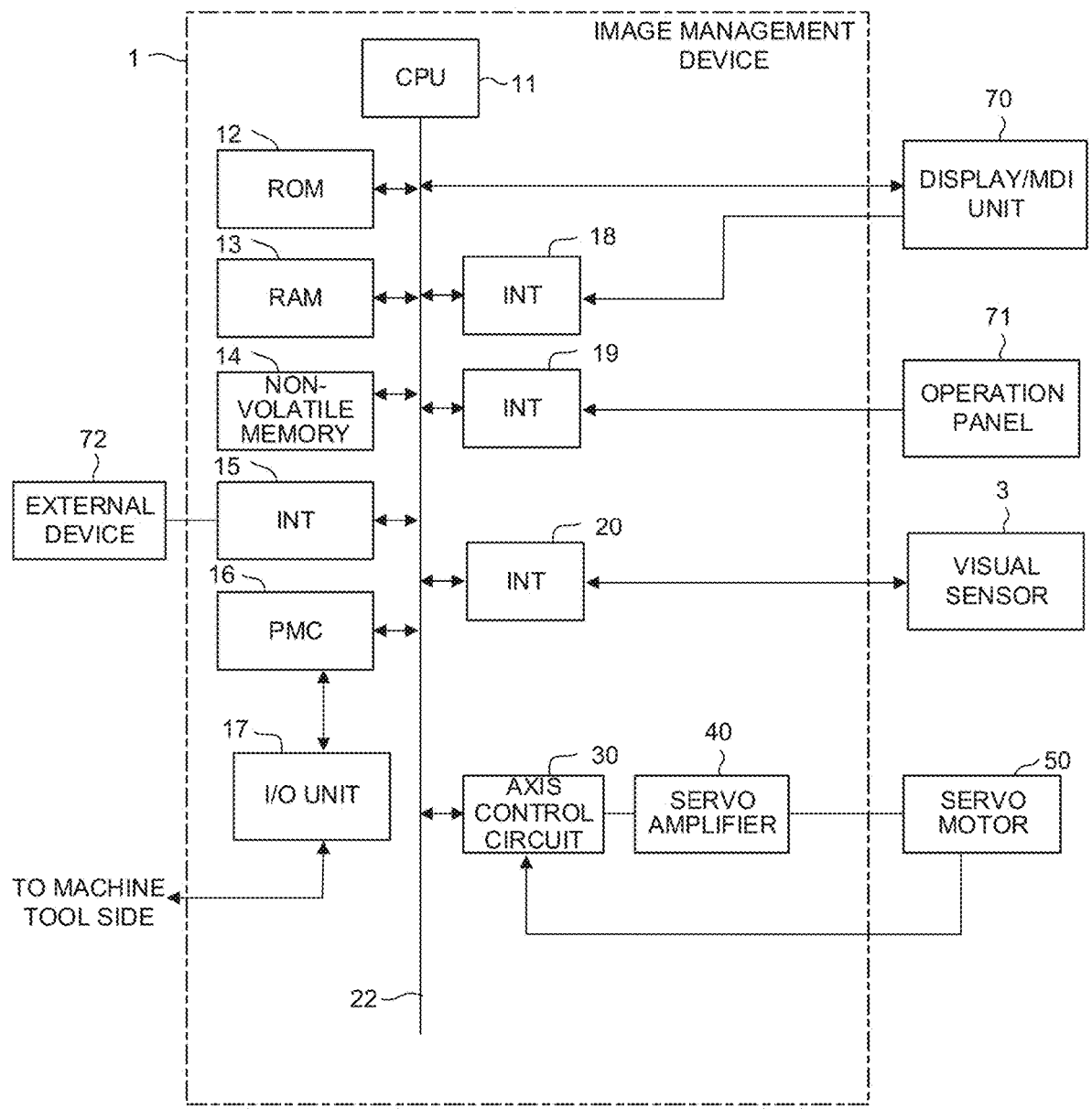
FIG. 1 is a hardware configuration diagram schematically illustrating an image management device according to an embodiment.

FIG. 1 is a hardware configuration diagram schematically illustrating chief parts of an image management device according to an embodiment of the present invention. An image management device 1 can be mounted as a control device which controls a manufacturing machine such as a robot and a machine tool. Further, the image management device 1 can be mounted as a computer such as a personal computer juxtaposed to a control device for controlling a manufacturing machine, and a cell computer, a host computer, and a cloud server that are connected with the control device via a network. FIG. 1 illustrates an example of a case that the image management device 1 is mounted as a control device controlling a manufacturing machine (robot) provided with a visual sensor.

A CPU 11 included in the image management device 1 according to the present embodiment is a processor for entirely controlling the image management device 1. The CPU 11 reads out a system program stored in a ROM 12 via a bus 22 and controls the whole of the image management device 1 in accordance with the system program. A RAM 13 temporarily stores temporary calculation data and display data and various kinds of data which are inputted by an operator via an input unit, which is not shown, for example.

A non-volatile memory 14 is configured as a memory which is backed up by a battery, which is not shown, for example, and accordingly whose storage state is maintained even when the image management device 1 is turned off. The non-volatile memory 14 stores a control program which is read from an external device 72 via an interface 15, a control program which is inputted via a display/MDI unit 70, and various kinds of data which are acquired from each part of the image management device 1, a manufacturing machine, a sensor, and the like. The control programs and the various kinds of data stored in the non-volatile memory 14 may be developed on the RAM 13 when being executed/used. Further, various kinds of system programs such as a known analysis program are preliminarily written in the ROM 12.

The interface 15 is an interface for connecting the image management device 1 with the external device 72 such as an adapter. Control programs, various kinds of parameters, and the like are read from the external device 72 side. Further, it is possible to store control programs, various kinds of parameters and data, and the like, which are edited in the image management device 1, in an external storage means via the external device 72. A programmable machine controller (PMC) 16 outputs a signal to a manufacturing machine via an I/O unit 17 and controls the manufacturing machine, based on a sequence program incorporated in the image management device 1. Further, the PMC 16 receives signals of various types of switches and the like of an operation panel provided on the main body of the manufacturing machine and passes the signals to the CPU 11 after performing necessary signal processing.

The display/MDI unit 70 is a manual data input device provided with a display, a keyboard, and the like, and an interface 18 receives commands and data from the keyboard of the display/MDI unit 70 and passes the commands and the data to the CPU 11. An interface 19 is connected to an operation panel 71 provided with a manual pulse generator and the like, which is used for manually driving each axis.

An axis control circuit 30 for controlling axes included in a manufacturing machine receives an axis moving command from the CPU 11 and outputs the axis moving command to a servo amplifier 40. The servo amplifier 40 drives a servo motor 50 for moving axes provided in the manufacturing machine, in response to the command. The servo motor 50 for axes incorporates a position/speed detector. The servo motor 50 feeds back a position/speed feedback signal from this position/speed detector to the axis control circuit 30, thus performing position/speed feedback control.

Here, though the hardware configuration diagram of FIG. 1 illustrates only a single axis control circuit 30, a single servo amplifier 40, and a single servo motor 50, the axis control circuits 30, the servo amplifiers 40, and the servo motors 50 are practically prepared in the number of axes provided in a manufacturing machine which is a control object.

Figure 2:
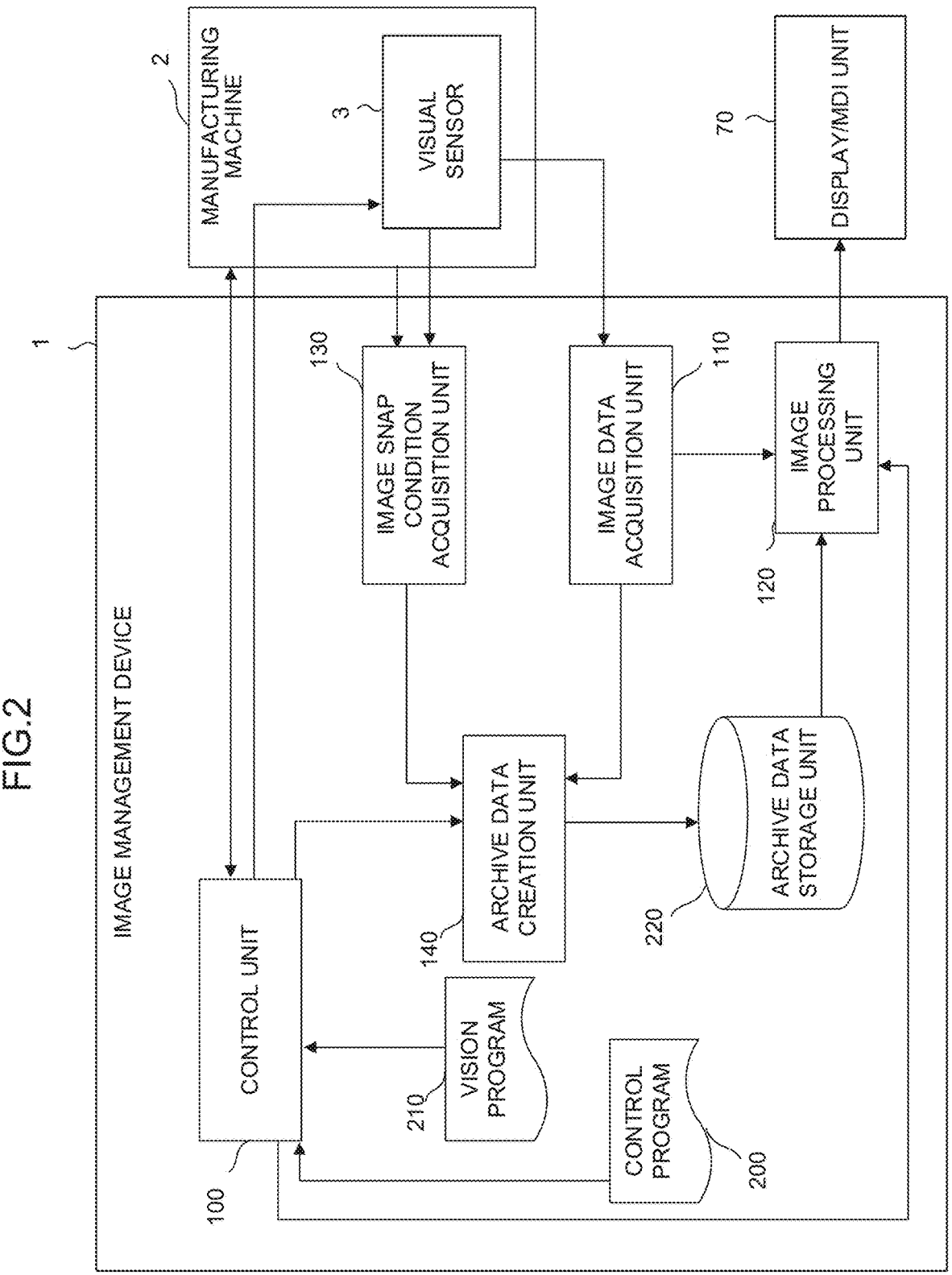
FIG. 2 is a functional block diagram schematically illustrating the image management device according to the embodiment.

FIG. 2 is a functional block diagram schematically illustrating the image management device 1 according to the embodiment. Each functional block illustrated in FIG. 2 is realized such that the CPU 11 included in the image management device 1 illustrated in FIG. 1 executes each system program and controls an operation of each unit of the image management device 1.

The image management device 1 according to the present embodiment includes a control unit 100, an image data acquisition unit 110, an image processing unit 120, an image snap condition acquisition unit 130, and an archive data creation unit 140. The control unit 100 controls a manufacturing machine 2 and a visual sensor 3 based on a control program 200 and a vision program 210. The image data acquisition unit 110 acquires image data snapped by the visual sensor 3. The image processing unit 120 performs image processing with respect to image data acquired by the image data acquisition unit 110. The image snap condition acquisition unit 130 acquires image snap conditions applied when image data is snapped, from the manufacturing machine 2 and the visual sensor 3. The archive data creation unit 140 creates archive data in which one or a plurality of image data and image snap conditions are put together based on image data acquired by the image data acquisition unit 110, image snap conditions acquired by the image snap condition acquisition unit 130, and control states of the control unit 100, and stores the archive data in an archive data storage unit 220 secured on a memory such as the non-volatile memory 14.

The control unit 100 is a functional means for controlling the manufacturing machine 2 so that the manufacturing machine 2 snaps one or a plurality of images of a snapped object, based on the control program 200 and the vision program 210 read from the non-volatile memory 14. The control unit 100 controls the manufacturing machine 2 based on an axis driving command or the like issued based on the control program 200 so as to adjust a relative position between an object to be snapped and the visual sensor 3 and a direction of the visual sensor 3 with respect to the image snap object, and snaps one or a plurality of images while adjusting exposure time, an optical magnification/reduction ratio, a binning level, an image snap range, and so on in image snap by the visual sensor 3 in accordance with a command based on the vision program 210. Further, the control unit 100 commands the image processing unit 120 to perform image processing commanded based on the vision program 210 with respect to image data acquired by the image data acquisition unit 110.

The manufacturing machine 2 controlled by the control unit 100 is typically an articulated robot, and in this case, any kind of robot may be employed as long as the visual sensor 3 can be attached to the robot. Further, the manufacturing machine 2 is a machine which is installed in a factory such as a machine tool to which the visual sensor 3 can be attached, a peripheral machine of the machine tool, various kinds of processing machines, and a conveyance apparatus for an object to be snapped such as a conveyer. Any machine can be employed as the manufacturing machine 2 as long as the machine is related to a snapped object of the visual sensor 3. The manufacturing machine 2 is preferably capable of adjusting a relative position between the visual sensor 3 and a snapped object and a direction of the visual sensor 3 with respect to the image snap object.

The visual sensor 3 controlled by the control unit 100 is typically a camera but may be a three-dimensional sensor or the like. The visual sensor 3 may be capable of adjusting exposure time, an optical magnification/reduction ratio (or a focal distance), a binning level, an image snap range, and so on in image snap. The visual sensor 3 may be attached to a fixing unit of the manufacturing machine 2 in a fixed manner or may be attached to an operating unit (a hand of a robot, for example) of the manufacturing machine 2. Even though the visual sensor 3 is attached to the manufacturing machine 2 in a fixed manner, a relative position between the visual sensor 3 and a snapped object and a direction of the visual sensor 3 with respect to the image snap object can be adjusted if the position or the direction of the image snap object can be controlled.

The image data acquisition unit 110 acquires data of an image, which is snapped by the visual sensor 3 under the control of the control unit 100, from the visual sensor 3. Image data acquired by the image data acquisition unit 110 from the visual sensor 3 may be common raster data or image data in a predetermined image format such as the JPEG format, the TIFF format, and the PNG format.

The image processing unit 120 is a functional means that performs image processing with respect to image data acquired by the image data acquisition unit 110 or image data taken from archive data stored in the archive data storage unit 220. The image processing performed by the image processing unit 120 may be known image filtering processing, such as edge enhancement, smoothing, and shading, with respect to image data; known image detection processing such as edge detection and pattern matching; known image measurement processing such as distance measurement and lightness measurement; and composition processing of a plurality of images and processing for dividing one image into a plurality of images. The image processing unit 120 performs image processing with respect to image data acquired by the image data acquisition unit 110 in response to a command from the control unit based on an image processing command included in the vision program 210. The image processing unit 120 may use an image snap condition, which is acquired by the image snap condition acquisition unit 130, for image processing as appropriate.

The image processing unit 120 may display a result of image processing on the display/MDI unit 70, for example, or may store the result of the image processing in the non-volatile memory 14 or output the result of the image processing to the external device 72, for example, so that an operator can use the result of the image processing later.

The image snap condition acquisition unit 130 is a functional means that acquires an image snap condition in snapping an image of an object to be snapped, from the manufacturing machine 2 and the visual sensor 3. The image snap condition acquisition unit 130 acquires information, by which conditions such as a relative position between a snapped object and the visual sensor 3 and a direction of the visual sensor 3 with respect to the image snap object can be specified, from the manufacturing machine 2, and acquires information, by which conditions such as exposure time, an optical magnification/reduction ratio, a binning level, an image snap range, and intensity of illumination in image snap can be specified, from the visual sensor 3. Here, the information by which conditions can be specified includes information by which the conditions can be directly/indirectly specified. For example, conditions on a position and a direction related to the visual sensor 3 may be not only a position and a direction of the visual sensor 3 itself but also a position of each axis of the manufacturing machine 2 to which this visual sensor 3 is attached.

The image snap condition acquisition unit 130 may acquire the information, by which conditions can be specified, from a control command to the manufacturing machine 2 and the visual sensor 3 issued by the control unit 100. Further, the image snap condition acquisition unit 130 may acquire other physical amounts which influence on image snap such as an environmental temperature, environmental humidity, and luminance, from other sensors which are not shown. Image snap conditions acquired by the image snap condition acquisition unit 130 can include a condition required for later reproducing an image snap state of acquired image data. When a plurality of images are snapped in a unit of one detection as described later, for example, information by which an image file can be uniquely specified (a file name of an image file, for example) may be added to image snap conditions as a subsidiary element so as to clarify association between image snap conditions and images respectively.

The archive data creation unit 140 is a functional means which creates archive data, in which image data acquired by the image data acquisition unit 110 and image snap conditions acquired by the image snap condition acquisition unit 130 are put together, and stores the archive data in the archive data storage unit 220. The archive data creation unit 140 creates one archive data from one set of image data, which is snapped based on commands of the control program 200 and the vision program 210 and acquired in a unit of one detection (image snap unit), and image snap conditions of the image data. For example, when to snap an image of an object once is commanded as a unit of one detection by the control program 200 and the vision program 210, one archive data is created from one image data and one image snap condition. Further, when to snap an image of one workpiece twice with different exposure time is commanded as a unit of one detection by the control program 200 and the vision program 210, one archive data is created from two image data and two image snap conditions.

Furthermore, when to snap images of one workpiece from a plurality of angles is commanded as a unit of one detection, one archive data is created from a plurality of image data and a plurality of image snap conditions.

An archive data created by the archive data creation unit 140 may be data obtained by storing one or a plurality of image data and one or a plurality of image snap conditions in one folder, for example.

Further, archive data created by the archive data creation unit 140 may be data obtained by storing one or a plurality of image data and one or a plurality of image snap conditions in one compressed file, for example. In this case, the compressed file is preferably a compressed file in a compression format (typically the ZIP format, for example) supported as standard by a control device and so on which are installed in a factory. The archive data creation unit 140 typically records image snap conditions in one or a plurality of text files in the XML format, the JSON format, or the like, and stores the one or plurality of text files in archive data. However, the archive data creation unit 140 may record image snap conditions in a file in a data format requiring no special software for access or a format supported by a control device and the like and store the file in archive data. The archive data creation unit 140 may create one file of image snap conditions for each image data. However, when image snap conditions are recorded in a text file in the above-mentioned XML format or JSON format, for example, the archive data creation unit 140 may record the image snap conditions as one file with respect to a plurality of image data.

One operation example of the above-described image management device 1 is described below.

Figure 3:
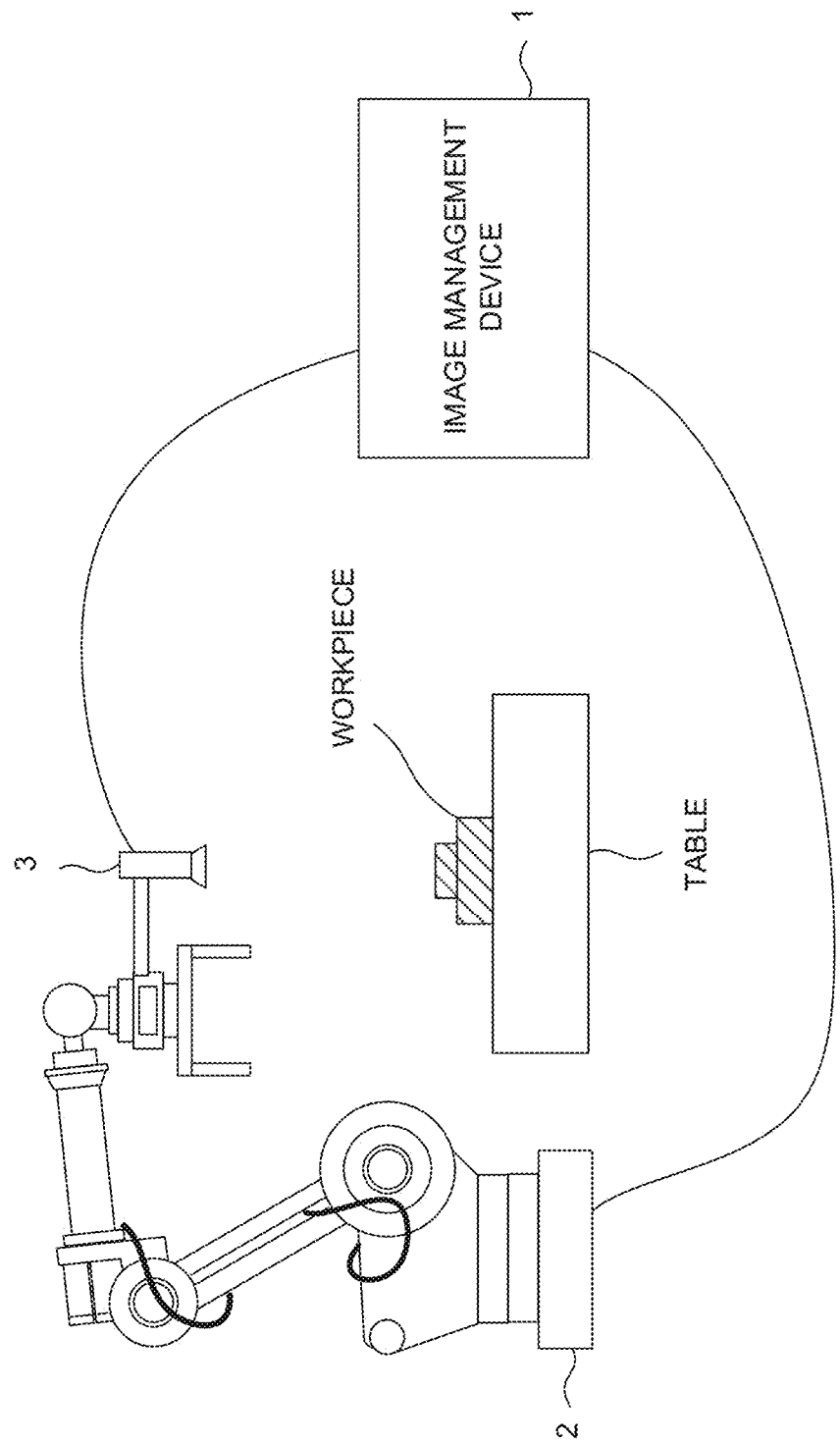
FIG. 3 is a diagram illustrating an operation example of the image management device.
Figures 4, 5:
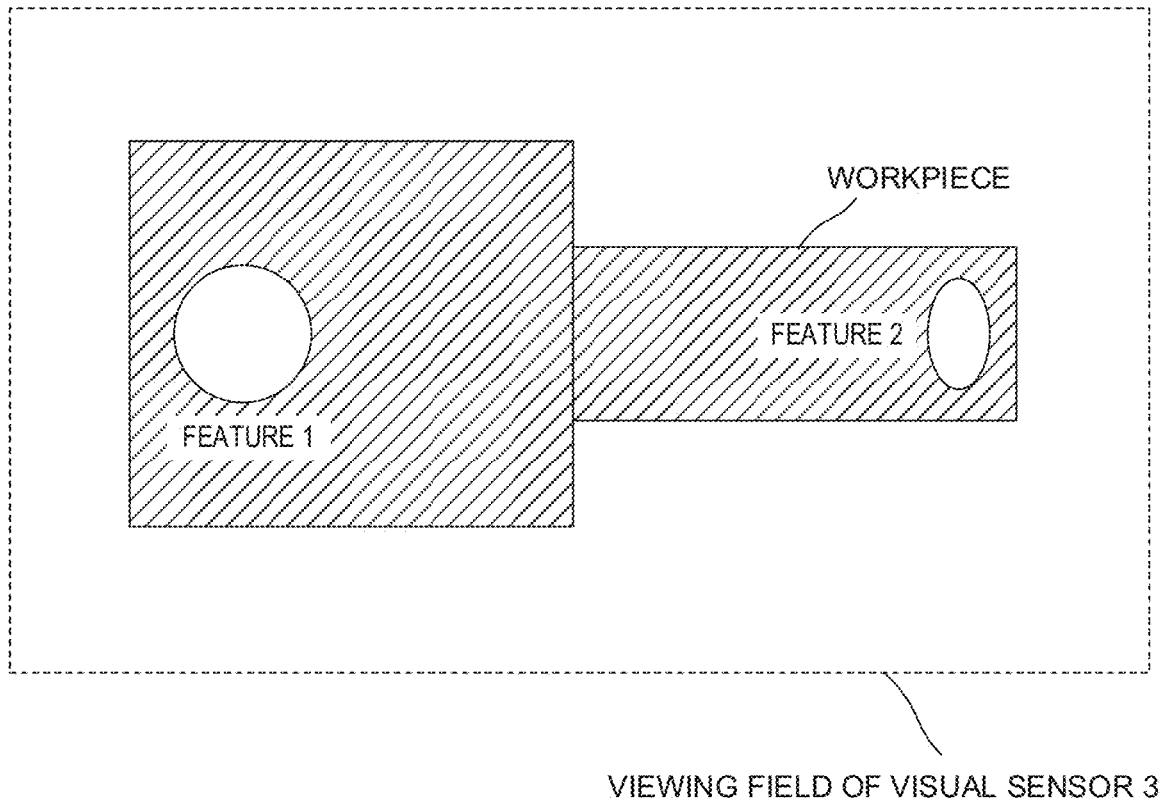
FIG. 4 is a diagram illustrating an example of an object to be snapped.
FIG. 5 is a diagram illustrating an example of a control program.

As illustrated in FIG. 3, a state is considered in which the image management device 1 acquires image data for measuring a position of a workpiece, which is placed on a table and is a snapped object to, by controlling the manufacturing machine 2 serving as a robot and the visual sensor 3. As illustrated in FIG. 4, in the workpiece which is the image snap object, features 1 and 2 which are distinctive shapes are provided on an upper surface of the workpiece and a position of the workpiece which is the image snap object can be specified based on these features. It is considered to execute the control program 200 for the manufacturing machine 2 illustrated in FIG. 5, for example, in the above-mentioned state. In FIG. 5, a program command MOVE_TO on the first line is a command for moving a robot hand to a specified position P1. A program command VISION_FIND on the second line is a command for executing a vision program VP1. Snap of an image of a snapped object, acquisition of image data, and image processing with respect to an acquired image are performed in response to this command. A program command VISION_SAVE on the third line is a command for storing image data which is obtained by executing the vision program VP1 and image snap conditions in archive data "/log/00001.zip".

Here, it is assumed that the vision program VP1 is configured so that a plurality of images are snapped in different exposure time. Specifically, it is commanded to perform the following operations in the vision program VP1.

Operation 1) The robot hand is moved to a position 1 and an image 1 is snapped in exposure time 1.

Operation 2) The robot hand is moved to a position 2 and an image 2 is snapped in exposure time 2.

Operation 3) The feature 1 of a snapped object to be is detected from the image 1.

Operation 4) The feature 2 of the image snap object is detected from the image 2.

Operation 5) A three-dimensional position of the feature 1 in a coordinate system of the robot is obtained based on a position of the feature 1 on the image. A three-dimensional position can be easily calculated if the visual sensor 3 is calibrated in advance.

Operation 6) A three-dimensional position of the feature 2 in the coordinate system of the robot is obtained based on a position of the feature 2 on the image.

Operation 7) A three-dimensional position of the image snap object is obtained based on the three-dimensional positions of the feature 1 and the feature 2 in the coordinate system of the robot. For example, a midpoint between the feature 1 and the feature 2 may be set as the three-dimensional position of the image snap object.

The image data acquisition unit 110 acquires image data of the image 1 and image data of the image 2 respectively from the visual sensor 3 in the above-described flow of the operations. Further, the image snap condition acquisition unit 130 acquires, as the image snap conditions, positions of the manufacturing machine 2 (positions of the robot hand) and setting of the visual sensor 3 in the respective image snap of the images 1 and 2. Then, the archive data creation unit 140 stores a plurality of acquired image data (the image 1 and the image 2) in one archive data /log/00001.zip and stores the archive data in the archive data storage unit 220. At this time, the archive data creation unit 140 records image snap conditions in a text file in the JSON format illustrated in FIG. 6, for example, and stores the text file in archive data. The text file for recording image snap conditions illustrated in FIG. 6 is used as one text file for recording image snap conditions of a plurality of images, but the archive data creation unit 140 may record image snap conditions in respective text files which are created for respective image data.

These processes are performed in accordance with commands based on the control program 200 or the vision program 210. The above-described operations can be commanded based on the control program 200 or the vision program 210, realizing applications meeting a purpose of an operator: archive data is managed such that a name of the archive data is arbitrarily specified by a part number or the like of a workpiece which is a snapped object to be, and archive data is stored by constructing an arbitrary logic (for example, an image is stored only when detection is failed), for example. Here, storage of archive data can be commanded not based on the control program 200 but based on the vision program 210.

Archive data thus stored in the archive data storage unit 220 is recognized as a single file (/log/00001.zip) stored in a file system when viewed from an operator, so that the file can be taken out to be copied on an arbitrary place or contents of the file can be viewed.

Further, by creating the control program 200 illustrated in FIG. 7, image data and image snap conditions may be taken from archive data stored in the archive data storage unit 220 at arbitrary timing and image processing based on the taken image data and image snap conditions may be performed. In FIG. 7, a program command VISION_LOAD on the first line is a command for reading and using an image file and image snap conditions stored in archive data "/log/00001.zip" as an acquisition destination of an image with respect to the vision program VP1. Further, a program command VISION_FIND on the second line is a command for executing the vision program VP1. Based on this program command VISION_FIND, image processing with respect to image data is performed with the image file and the image snap conditions which are read from the archive data "/log/00001.zip" as inputs. At this time, not a current position of the robot but a position of the robot read from the archive data "/log/00001.zip" is used as a position of the robot used in the vision program VP1.

Thus, by reading previously-snapped image data with necessary image snap conditions, a state at the time of an occurrence of a trouble can be reproduced and an image snapped based on one vision program can be reused at arbitrary timing in another vision program without wasting image snap time.

Figure 8:
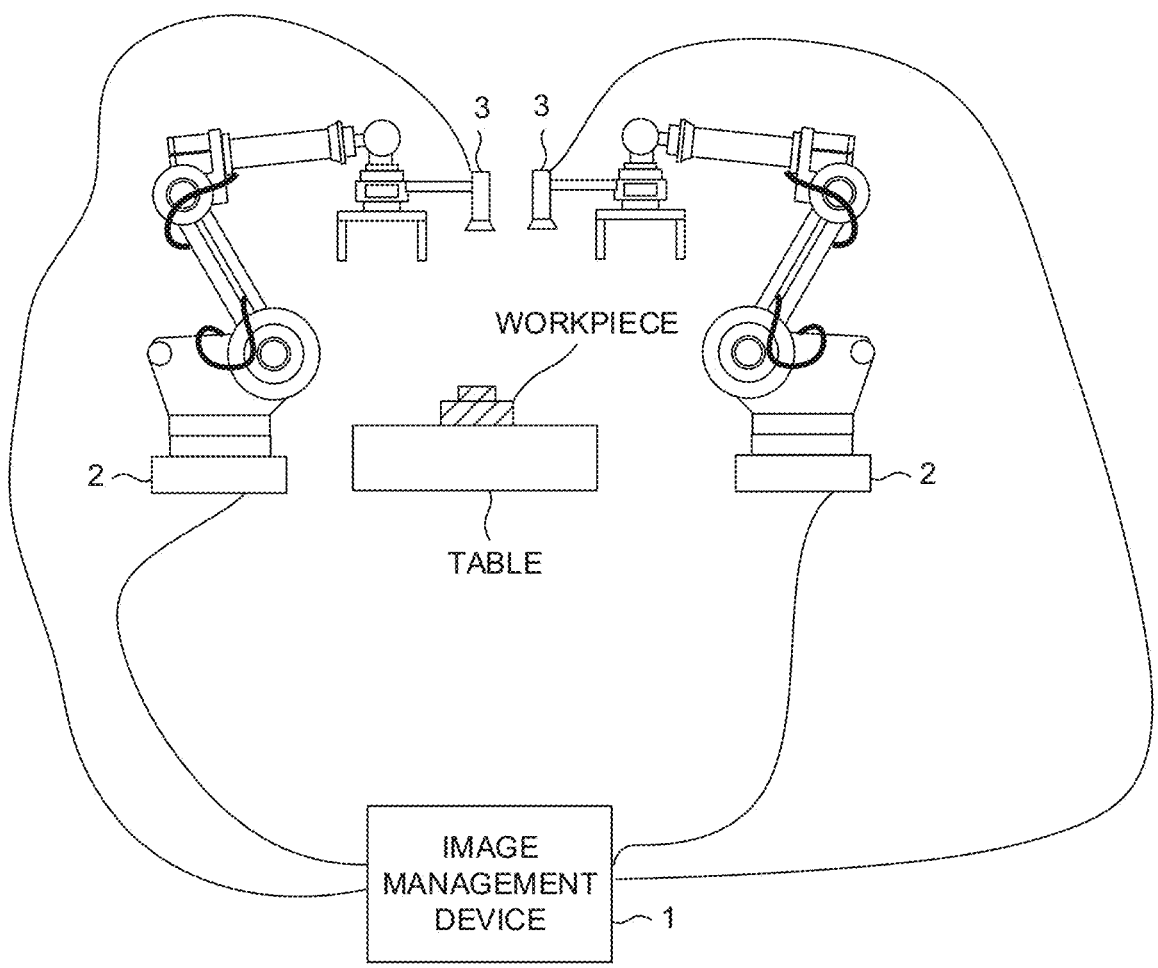
FIG. 8 is a diagram illustrating another operation example of the image management device.

Here, various operations for snapping an image of a snapped object by using the visual sensor 3 are conceivable as well as the above-described operation example. For example, the example of FIG. 3 may employ a configuration in which a plurality of visual sensors are attached to predetermined positions of the robot serving as the manufacturing machine 2 so as to simultaneously snap a plurality of images of a snapped object and the plurality of images are stored in one archive data by setting this image snap for a plurality of images as a unit of one detection. Further, as illustrated in FIG. 8, an example is conceivable in which robots serving as a plurality of manufacturing machines 2 provided with the visual sensor 3 are arranged with respect to a workpiece which is a snapped object and the image management device 1 controls these robots serving as the plurality of manufacturing machines 2 at once so as to snap images of the workpiece. When such a configuration is employed, the above-described operation 1 and operation 2 can be simultaneously performed by controlling robots serving as respective manufacturing machines 2 and thus image snap time of a workpiece can be shortened. Images snapped by the robots serving as two manufacturing machines 2 are stored in one archive data as images snapped in a unit of one detection. Needless to say, each robot may snap a plurality of images of a snapped object while changing image snap conditions and a plurality of images obtained by controlling a plurality of robots and visual sensors 3 may be stored in one archive data as an image group obtained in a unit of one detection.

Further, the present invention can be appropriately applied to the case that a robot serving as the manufacturing machine 2 is allowed to grip a workpiece which is a snapped object and the robot is controlled to snap images while changing a position and a direction of the workpiece with respect to the visual sensor 3.

The embodiment of the present invention has been described above. However, the present invention is not limited to the examples of the above-described embodiment and the present invention can be embodied in other aspects by adding alterations as appropriate.

The invention claimed is:

1. An image management device that manages image data of an object snapped by a visual sensor in an environment in which a manufacturing machine is installed, the image management device comprising:
a processor configured to
acquire image data snapped by the visual sensor,
acquire an image snap condition applied when the image data is snapped, from the manufacturing machine and the visual sensor, and
create archive data in which both the image data and the image snap condition are stored in a file; and
an archive data storage configured to store the archive data, wherein
the image snap condition includes
(a) information, from the manufacturing machine, by which relative position and/or a direction of the visual sensor with respect to the image snap object is specified, and
(b) information, from the visual sensor, relating to at least one of
(1) an optical magnification/reduction ratio,
(2) a binning level,
(3) an image snap range,
(4) exposure time, and
(5) intensity of illumination.

2. The image management device according to claim 1, wherein the processor is further configured to create one archive data based on one or a plurality of image data, the one or plurality of image data being obtained in a unit of one detection, and one or a plurality of image snap conditions of the one or plurality of image data.

3. The image management device according to claim 1, wherein the file is one compressed file.

4. The image management device according to claim 1, wherein the image snap condition further includes a file name of an image file that are applied in snapping the image data.

5. The image management device according to claim 1, wherein the processor is further configured to create archive data at arbitrary timing commanded by a program.

6. The image management device according to claim 1, wherein the processor is further configured to create archive data with an arbitrary file name commanded by a program.

7. The image management device according to claim 1, wherein the processor is further configured to
take out image data and an image snap condition, the image data and the image snap condition being stored in archive data stored in the archive data storage, and perform image processing based on the image data and the image snap condition which are taken out.

8. The image management device according to claim 7, wherein the processor is further configured to
- take out image data and an image snap condition, the image data and the image snap condition being stored in archive data, at arbitrary timing commanded by a program, and
- perform image processing based on the image data and the image snap condition which are taken out.

9. The image management device according to claim 1, wherein
- the image snap condition is recorded in the archive data in a data format requiring no special software for access or in a format supported by a control device of the manufacturing machine.

10. The image management device according to claim 1, wherein the file that stores both the image data and the image snap condition is accessible or callable from within a control program for controlling the manufacturing machine.

11. The image management device according to claim 1, wherein
the image snap condition includes both
- (a) the information, from the manufacturing machine, by which the relative position and/or the direction of the visual sensor with respect to the image snap object is specified, and
- (b) the information, from the visual sensor, relating to all of
  - (1) the optical magnification/reduction ratio,
  - (2) the binning level,
  - (3) the image snap range,
  - (4) the exposure time, and
  - (5) the intensity of illumination.

12. The image management device according to claim 1, wherein
the processor is further configured to create one archive data based on one or a plurality of image data, the one or plurality of image data being obtained in a unit of one detection, and one or a plurality of image snap conditions of the one or plurality of image data,
the image snap condition further includes a file name of an image file that are applied in snapping the image data, and
the archive data in the unit of one detection is created from one of
- (i) one image data and one image snap condition,
- (ii) two image data and two image snap conditions, or
- (iii) a plurality of image data and a plurality of image snap conditions.

13. An image management method of managing image data that is snapped by a visual sensor in an environment in which a manufacturing machine is installed, the image management method comprising:
- acquiring image data snapped by the visual sensor;
- acquiring an image snap condition applied when the image data is snapped, from the manufacturing machine and the visual sensor;
- creating archive data in which both the image data and the image snap condition are stored in a file; and
- storing the archive data, wherein the image snap condition includes
  - (a) information, from the manufacturing machine, by which relative position and/or a direction of the visual sensor with respect to the image snap object is specified, and
  - (b) information, from the visual sensor, relating to at least one of
    - (1) an optical magnification/reduction ratio,
    - (2) a binning level,
    - (3) an image snap range,
    - (4) exposure time, and
    - (5) intensity of illumination.

14. The image management method according to claim 13, further comprising accessing or calling the file that stores both the image data and the image snap condition, from within a control program for controlling the manufacturing machine.

* * * * *